(12) United States Patent
Fan (10) Patent No.: US 12,517,660 B2
(45) Date of Patent: Jan. 6, 2026

(54) METHOD, DEVICE, AND PROGRAM PRODUCT FOR WEAR LEVELING

(71) Applicant: Dell Products L.P., Round Rock, TX (US)

(72) Inventor: Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/929,859

(22) Filed: Oct. 29, 2024

(65) Prior Publication Data

US 2025/0335104 A1    Oct. 30, 2025

(30) Foreign Application Priority Data

Apr. 26, 2024  (CN) .......................... 202410516872.7

(51) Int. Cl.
*G06F 3/06*    (2006.01)

(52) U.S. Cl.
CPC .......... *G06F 3/0616* (2013.01); *G06F 3/0659* (2013.01); *G06F 3/0689* (2013.01)

(58) Field of Classification Search
CPC .... G06F 3/0616; G06F 3/0659; G06F 3/0689; G06F 3/0679; G06F 3/0688; G06F 3/064; G06F 12/0246; G06F 12/023; G06F 12/1044

See application file for complete search history.

(56) References Cited

U.S. PATENT DOCUMENTS

| | | | |
|---|---|---|---|
| 9,348,761 B1 | 5/2016 | Cummins et al. | |
| 9,811,288 B1 | 11/2017 | Chen et al. | |
| 10,067,840 B1 | 9/2018 | Labaj et al. | |
| 10,082,965 B1 | 9/2018 | Tamilarasan et al. | |
| 10,209,904 B2 | 2/2019 | Himelstein et al. | |
| 2010/0027335 A1* | 2/2010 | Kim ..................... | G11C 11/5628 365/185.29 |
| 2010/0077135 A1* | 3/2010 | Li ....................... | G06F 12/0246 711/E12.001 |
| 2013/0179624 A1 | 7/2013 | Lambert et al. | |
| 2016/0232954 A1* | 8/2016 | Kim ................... | G11C 16/3495 |
| 2022/0121563 A1 | 4/2022 | Kamran et al. | |

(Continued)

OTHER PUBLICATIONS

Hailan Dong; et al.; "Method, Device, and Computer Program Product for Wear Leveling," U.S. Appl. No. 18/929,838, filed Oct. 29, 2024.

*Primary Examiner* — Hiep T Nguyen
(74) *Attorney, Agent, or Firm* — BainwoodHuang (57) ABSTRACT

Techniques for wear leveling involve identifying a detected disk as a target disk in response to detecting the disk with a degree of wear greater than a first threshold in a plurality of disks of a storage array. Such techniques further involve determining, in response to the number of the target disks being greater than or equal to a second threshold, an updated weight for disk wear based on the degree of wear of the target disk and an impact attenuation factor associated with the degree of wear. Such techniques further involve performing, based on the updated weight for the disk wear, wear leveling for an input/output (IO) request on the plurality of disks in the storage array. In this way, it can effectively avoid deterioration of the storage performance caused by end of life (EOL) of too many disks at the same time point or cycle.

20 Claims, 5 Drawing Sheets

(56) References Cited

U.S. PATENT DOCUMENTS

| | | | | |
|---|---|---|---|---|
| 2022/0244877 A1* | 8/2022 | Chen | ...................... | G06F 3/0647 |
| 2022/0308766 A1* | 9/2022 | Onishi | .................. | G06F 3/0616 |
| 2022/0365684 A1* | 11/2022 | Xu | ...................... | G06F 11/3037 |
| 2022/0414102 A1 | 12/2022 | Shatsky et al. | | |
| 2023/0028708 A1* | 1/2023 | Basel | ...................... | G06N 20/00 |
| 2023/0214115 A1 | 7/2023 | Lee et al. | | |
| 2023/0342031 A1 | 10/2023 | Dong et al. | | |
| 2024/0354015 A1 | 10/2024 | Shatsky et al. | | |
| 2025/0006816 A1* | 1/2025 | Lin | ...................... | H10D 84/017 |
| 2025/0231866 A1* | 7/2025 | Sforzin | ................ | G06F 21/552 |

\* cited by examiner

METHOD, DEVICE, AND PROGRAM PRODUCT FOR WEAR LEVELING

CROSS-REFERENCE TO RELATED APPLICATION

This application claims priority to Chinese Patent Application No. CN202410516872.7, on file at the China National Intellectual Property Administration (CNIPA), having a filing date of Apr. 26, 2024, and having "METHOD FOR WEAR BALANCE, DEVICE, AND PROGRAM PRODUCT" as a title, the contents and teachings of which are herein incorporated by reference in their entirety.

TECHNICAL FIELD

Embodiments of the present disclosure generally relate to the field of storage, and more particularly, to a method, a device, and a program product for wear leveling.

BACKGROUND

A storage array is a matrix storage structure composed of a plurality of storage units, for example, a plurality of disks (such as hard disk drives (HDDs), solid-state drives (SSDs), and solid-state hybrid drives (SSHDs)) arranged in the form of rows multiplied by columns. This array technology integrates a plurality of disks into a single storage device and causes data to be dispersed and stored on different disks in a manner such as striping.

When accessing data, the plurality of disks in the array can work collaboratively, which not only improves the utilization of the storage space but also significantly reduces the latency of data access. The storage array adopts different levels of redundant array of independent disks (RAID), and these levels aim to be adaptable to the security and reliability requirements of data for different system environments and application scenarios.

SUMMARY OF THE INVENTION

The embodiments of the present disclosure provide a solution for wear leveling, which effectively prevents storage performance degradation caused by concentrated aging of a large number of disks in an array, and dynamically adjusts data distribution according to a degree of wear, thereby achieving wear leveling in the storage array.

In the first aspect of the present disclosure, a method for wear leveling is provided. The method includes identifying a detected disk as a target disk in response to detecting the disk with a degree of wear greater than a first threshold in a plurality of disks of a storage array. The method further includes determining, in response to the number of the target disks being greater than or equal to a second threshold, an updated weight for disk wear based on the degree of wear of the target disk and an impact attenuation factor associated with the degree of wear. The method further includes performing, based on the updated weight for the disk wear, wear leveling for an IO request on the plurality of disks in the storage array.

In another aspect of the presentation disclosure, a device for wear leveling is provided. The device includes a processor and a memory, the memory being coupled to the processor and storing instructions, wherein the instructions, when executed by the processor, cause the device to perform actions including: identifying a detected disk as a target disk in response to detecting the disk with a degree of wear greater than a first threshold in a plurality of disks of a storage array. These actions further include determining, in response to the number of the target disks being greater than or equal to a second threshold, an updated weight for disk wear based on the degree of wear of the target disk and an impact attenuation factor associated with the degree of wear. These actions further include performing, based on the updated weight for the disk wear, wear leveling for an IO request on the plurality of disks in the storage array.

In still another aspect of the present disclosure, a computer program product is provided. The computer program product is tangibly stored on a non-transient computer readable storage medium and includes machine-executable instructions, wherein the machine-executable instructions, when executed, cause a machine to perform the method or process according to the embodiments of the present disclosure.

According to the solution for wear leveling in the embodiments of the present disclosure, a dynamic optimization solution mechanism is provided, which can effectively avoid deterioration of the storage performance caused by end of life (EOL) of too many disks at the same time point or cycle. In addition, the impact of wear on the storage array can be dynamically considered based on the different degrees of wear for the disks, so that data can be distributed more accurately in a balanced manner among the plurality of disks.

It should be noted that the section of Summary of the Invention is provided to introduce a series of concepts in a simplified manner, and these concepts will be further described in the Detailed Description below. The section of Summary of the Invention is neither intended to identify key features or necessary features of the present disclosure, nor intended to limit the scope of the present disclosure.

BRIEF DESCRIPTION OF THE DRAWINGS

By description of embodiments of the present disclosure in further detail with reference to the accompanying drawings, the above and other objectives, features, and advantages of the present disclosure will become more apparent, in which.

Throughout all the drawings, the same or similar reference numerals generally represent the same or similar elements.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and its variations should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or identical objects, unless otherwise specifically indicated.

As mentioned above, in order to improve the utilization of storage space and minimize the latency of data access, data can be distributed among a plurality of disks in a storage array. For example, the fully automated layering technology of virtual pool storage includes two disk leveling strategies: inter-layer leveling and intra-layer leveling. Generally speaking, disk leveling typically involves a process of wear (such as abrasion) leveling. For example, during the inter-layer leveling, wear leveling may offload excessive IO requests (such as write IOs) from a flash layer to a non-flash layer. During the intra-layer leveling, the purpose of wear leveling is leveling write IOs between disks within the same layer.

In terms of disk leveling, some related technologies have made improvements in DE, but such type of technologies always try to extend lifespans of disks, and therefore, it is impossible to avoid simultaneous end of life (EOL) of too many disks that leads to concurrent aging. In addition, some other related technologies assume that impacts of disks at different levels of wear on a storage array are the same, which is unreasonable. This is because, for example, when the degree of wear is low, for example, when writing to a disk at 5% of its quota, it often takes almost the same priority as that at 10% for processing, because the disk has enough potential to support upcoming IO requests for new data. When the degree of wear is above a high level, such as when it is greater than 85% of a write quota of the disk, different priorities are often used for different considerations. This is because every increase in the degree of wear near EOL greatly increases the risk of drive failure.

To solve the above and at least some of other potential problems, an embodiment of the present disclosure provides a solution for wear leveling. The solution includes identifying a detected disk as a target disk in response to detecting the disk with a degree of wear greater than a first threshold in a plurality of disks of a storage array. The solution further includes determining, in response to the number of the target disks being greater than or equal to a second threshold, an updated weight for disk wear based on the degree of wear of the target disk and an impact attenuation factor associated with the degree of wear. The solution further includes performing, based on the updated weight for the disk wear, wear leveling for an IO request on the plurality of disks in the storage array. In this way, it can effectively avoid deterioration of the storage performance caused by EOL of too many disks at the same time point or cycle. In addition, the impact of wear on the storage array can be dynamically considered based on the different degrees of wear for the disks, so that data can be distributed more accurately in a balanced manner among the plurality of disks.

The basic principles and several example implementations of the present disclosure are described below with reference to FIG. 1 to FIG. 6. It should be understood that these example embodiments are provided merely to enable those skilled in the art to better understand and then implement embodiments of the present disclosure, and are not intended to impose any limitation to the scope of the present disclosure.

Figure 1:
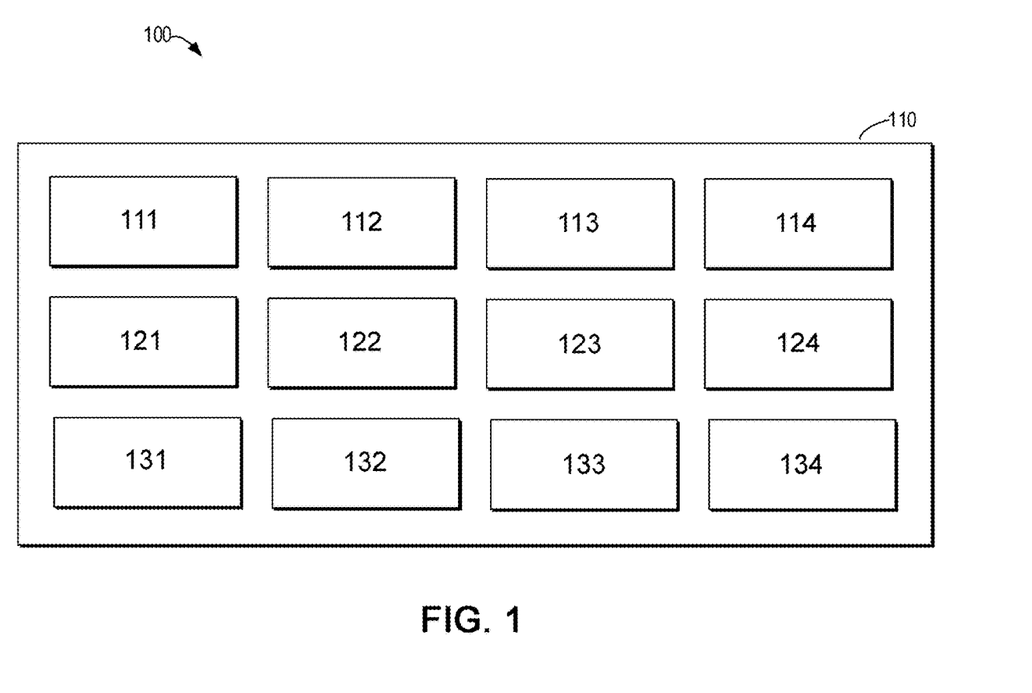
FIG. 1 illustrates a schematic diagram of an example environment in which a method and/or a process according to an embodiment of the present disclosure can be implemented.

FIG. 1 illustrates a schematic diagram of an example environment 100 in which a method and/or a process according to an embodiment of the present disclosure can be implemented. The example environment 100 illustrates, by way of example, a schematic diagram of a storage array 110 including a plurality of disk. As shown in FIG. 1, the storage array may include a plurality of disks 111 to 114, 121 to 124, and 131 to 134.

According to the embodiments of the present disclosure, the plurality of disks included in the storage array 110 may be arranged locally or distributed, and may be coupled to each other (for example, via a network or line) to achieve collaborative work. In response to a write operation on the storage array 110, data corresponding to the write operation may be dispersed and stored on the plurality of disks 111 to 114, 121 to 124, and 131 to 134. In addition, in response to a read operation targeting the storage array 110, data corresponding to the read operation may be accessed simultaneously. Through a reasonable balanced distribution strategy, the storage array 110 can ensure the uniformity of data access and avoid a performance bottleneck caused by excessive load on certain disks.

By way of example rather than limitation, the plurality of disks 111 to 114, 121 to 124, and 131 to 134 may include but are not limited to HDDs, SSDs, SSHDs, and the like. These disks may be flexibly arranged in a matrix form that includes several rows multiplying several columns, where the number of rows and the number of columns in the matrix may be determined based on actual storage needs and device configuration. In addition, the design of the storage array allows for the mixed use of different disk types, so that storage solutions may be flexibly configured according to specific performance and cost requirements. For example, the SSDs having high-speed performance may be utilized as a caching layer for frequent data access, while the high-capacity HDDs may be used as the primary storage layer, thereby balancing the performance and storage costs.

According to the embodiments of the present disclosure, the example environment 100 may further include, for example, a RAID controller (not shown) configured to manage distribution of data between a plurality of disks, thereby ensuring fast access and efficient storage of the data. At the same time, the RAID controller is further configured to achieve redundant storage of data, and disperse a plurality of copies of data on different disks to improve the data reliability and fault tolerance. When there is a disk failure, the RAID controller can utilize the redundant data to recover lost information, thereby ensuring the data integrity and availability.

It should be understood that only one storage array and a limited number of disks therein are shown in FIG. 1 for ease of understanding and illustration purposes. Of course, the method and/or process according to the embodiments of the present disclosure may also be applied to a plurality of storage arrays, and the plurality of storage arrays may have different arrangements from that shown in FIG. 1, for example, a plurality of disks being arranged in different numbers of rows or columns.

The schematic diagram of the example environment 100 in which the method and/or process according to an embodiment of the present disclosure can be implemented has been described above with reference to FIG. 1. A flowchart of a method 200 for wear leveling according to an embodiment of the present disclosure will be described below with reference to FIG. 2. In order to effectively prevent the storage performance degradation caused by the concentrated aging of a large number of disks in the array, and to achieve a more reasonable dynamic leveling strategy based on the degree of wear, a method 200 for wear leveling according to an embodiment of the present disclosure is proposed.

Figure 2:
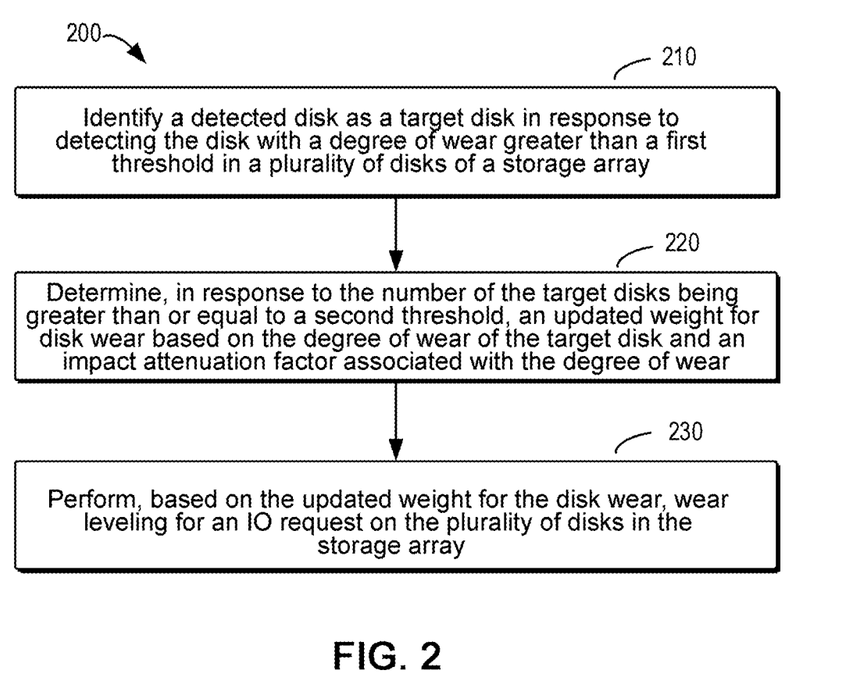
FIG. 2 illustrates a flowchart of a method for wear leveling according to an embodiment of the present disclosure.

At a block 210, a detected disk is identified as a target disk in response to detecting the disk with a degree of wear greater than a first threshold in a plurality of disks of a storage array. As mentioned above, when the degree of wear of the disk is in a low-level interval (also referred to as a healthy stage in the following text), it may be treated by using the same or similar priority. When the degree of wear of the disk is in a low-level interval (also known as a risk stage in the following text), the closer the degree of wear is to the EOL, the higher the risk of array failure. Therefore, during the risk stage, it is necessary to specifically consider the degree of wear and treat the disk with a degree of wear greater than the first threshold (that is, a degree threshold for disk wear) differently.

In some embodiments, the degree of wear for each disk in the plurality of disks of the storage array may be detected at a certain time frequency to determine the corresponding degree of wear for each disk. The time frequency may be predefined based on actual needs (such as accuracy requirements) of the wear leveling. If it is determined that the degree of wear of one or a plurality of disks in the array is greater than the predefined degree threshold, the one or a plurality of disks are identified as high-risk disks. Detection of the degree of wear according to an embodiment of the present disclosure will be described below in further detail.

At a block 220, an updated weight for disk wear is determined based on the degree of wear of the target disk and an impact attenuation factor associated with the degree of wear, in response to the number of the target disks being greater than or equal to a second threshold. When the number of disks identified as high-risk disks is small, the system does not need to respond immediately; instead, it updates the wear leveling strategy in response to the number of disks identified as high-risk disks exceeding a certain number (that is, the second threshold, also referred to as a number threshold for the disk wear). In this way, the weight for the disk wear is not updated frequently to result in unnecessary resource consumption; instead, a fault-tolerant mechanism is provided to respond to the weight for the disk wear when the risk level of the system exceeds a warning line, so as to update the wear leveling strategy. In this way, optimized resource utilization can be achieved, thereby further improving the storage performance of the array.

In some embodiments, the wear leveling strategy may also be updated in response to a ratio of high-risk disks to all disks exceeding a ratio threshold. According to the embodiments of the present disclosure, the updating of the wear leveling strategy is based on an impact attenuation factor associated with the degree of wear of the disk. The impact attenuation factor will remain stable or only fluctuate slightly within a limited range during the healthy stage of the disk, thereby reflecting that the degree of wear of the disk has a consistent impact on the entire array during this stage. During the risk stage of the disk, the impact attenuation factor sharply attenuates as the degree of wear of the disk approaches the EOL, which reflects that the degree of wear of the disk significantly affects the entire array during this stage. That is, the higher the degree of wear, the more likely it is to cause an array failure. Risk warning and the impact attenuation factor according to the embodiment of the present disclosure will be described in further detail below.

At a block 230, wear leveling is performed for an IO request on the plurality of disks in the storage array based on the updated weight for the disk wear. Compared with simply and falsely considering the impact of the degree of wear of the disk on the entire array as constant, the embodiment of the present disclosure considers the impact of the degree of wear of the disk on the entire array in stages during the wear leveling, and dynamically updates the wear leveling strategy based on the degrees of wear at different stages, thereby ensuring that the wear leveling strategy always remains consistent with changes in the disk wear.

According to the embodiments of the present disclosure, a dynamic optimization solution mechanism for wear leveling is provided, which can effectively avoid deterioration of the storage performance caused by EOL of too many disks at the same time point or cycle. In addition, the impact of wear on the storage array can be dynamically considered based on the different degrees of wear for the disks, so that data can be distributed more accurately in a balanced manner among the plurality of disks.

Figure 3:
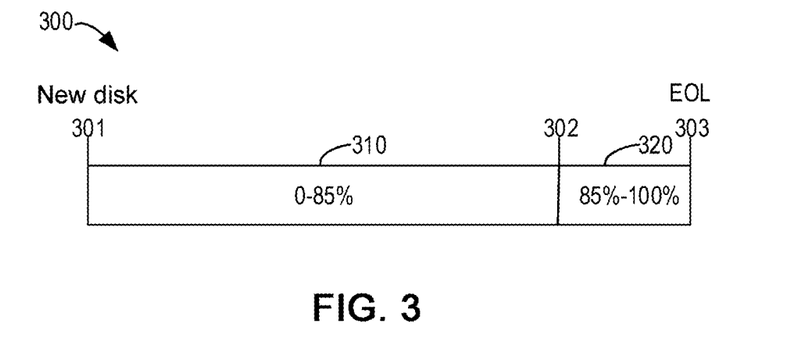
FIG. 3 illustrates an example of a staged disk lifeline according to an embodiment of the present disclosure.

FIG. 3 illustrates an example 300 of a staged disk lifeline according to an embodiment of the present disclosure. As shown in FIG. 3, the lifeline of the disk may be divided into two stages. One stage is a healthy stage 310, and the other stage is a risk stage 320. A point 301 on the lifeline indicates that the disk is a completely non-worn new disk, and a point 302 indicates a degree threshold for the degree of wear of the disk. An example value of the degree threshold in the figure is 85% of a write quota of the disk, and the write quota may refer to the maximum number of writes or the maximum write volume allowed by the disk. In addition, a point 303 indicates that the disk has reached an EOL of being completely worn and needs to be replaced.

According to the embodiment of the present disclosure, when the degree of wear of the disk falls within the healthy stage 310, it indicates that the degree of wear of the disk is low or acceptable, and its wear state is safe and sufficient to support upcoming IO requests. By way of example rather than limitation, during the healthy stage 310, an impact attenuation factor associated with the degree of wear of the disk may remain the same from the point 301 to the point 302 on the lifeline (that is, less than or equal to the degree threshold for the disk wear, for example, ≤85% as shown in the figure). This means that although the degree of wear of the disk during the healthy stage 310 is increasing, the impact on the entire array is the same, and there is no increase in the impact on the array due to the increase of the degree of wear.

According to the embodiment of the present disclosure, when the degree of wear of the disk falls within the risk stage 320, it indicates that the degree of wear of the disk is high or exceeds an acceptable range, and at this time, the wear state thereof is dangerous and it is difficult to support upcoming IO requests. By way of example rather than limitation, within the risk stage 320, the impact attenuation factor associated with the degree of wear of the disk may rapidly attenuate from the point 302 to the point 303 on the lifeline (that is, greater than the degree threshold for disk wear, for example, >85% as shown in the figure). This means that even if the degree of wear of the disk increases slightly during the risk stage 320, it may have a huge impact on the array. A calculation process of the impact attenuation factor according to an embodiment of the present disclosure will be described in further detail below.

The wear balancing aims to ensure the storage performance of the entire array by averaging the use of a plurality of disks in the storage array when processing IO requests (such as write IOs) or erase requests. According to the embodiment of the present disclosure, the wear leveling for the storage array may be based on at least one of the following: the degree of wear (write count, erase count, and the like) for each disk in a plurality of disks in the array, the capacity of each disk, or the temperature of each disk. The following Equation (1) provides a mathematical expression for a weighting criterion of the wear leveling for the storage array:

$$V = \omega_1 \cdot W + \omega_2 \cdot T + \omega_3 \cdot C \qquad \text{Equation (1)}$$

In the weighting criterion V in Equation (1), it is based on the wear W, the temperature T, and the capacity C of the disk, while $\omega_1$, $\omega_2$, and $\omega_3$ respectively indicate weights when considering the wear W, the temperature T, and the capacity C.

The Newton's law of cooling is an exponential attenuation model. The Newton's law of cooling allows determining the temperature of a cooled (or warmed) object based on the temperature of the surrounding environment and the time of the object entering the environment. According to the embodiments of the present disclosure, the degree of wear μ of the disk also has the above "temperature" attribute, that is, for a disk with a degree of wear μ exceeding the degree threshold, the closer the wear degree is to the EOL, the greater the risk of the storage performance degradation. The following Equation (2) provides a calculation process for the weight $\omega_1$ of the wear W:

$$\omega_{\mu=x} = \omega_{\mu=85\%} \times e^{-\lambda(x-85\%)} \qquad \text{Equation (2)}$$

In the weight calculation in Equation (2), $\omega_{\mu=x}$ indicates that performing wear leveling when the degree of wear μ of the disk is x (for example, x=50% may indicate that the degree of wear of the current disk is 50% of the quota) should consider the weight of the wear W, and λ is the impact attenuation factor associated with the degree of wear of the disk. In addition, $\omega_{\mu=85\%}$ indicates that performing the wear leveling when the degree of wear μ of the disk is x=85% should consider the weight of wear W. The impact of the degree of wear μ of the disk on the entire array during the healthy stage may be consistent, and therefore, $\omega_{\mu=0\%} = \omega_{\mu=85\%}$, which is a fixed value. A calculation process of the impact attenuation factor λ is shown by Equation (3) below.

$$\omega_{\mu=100\%} = \omega_{\mu=85\%} \times e^{-\lambda \cdot 15\%} \qquad \text{Equation (3)}$$

According to the embodiments of the present disclosure, the impact attenuation factor based on the Newton's law of cooling may be calculated based on a first weight corresponding to the disk being worn completely (for example, at the point 303 of the lifeline shown in FIG. 3) and a second weight corresponding to the degree of disk wear being less than or equal to the degree threshold for the disk wear (for example, between the point 301 and the point 302 of the lifeline shown in FIG. 3).

For example, at the endpoint of the lifeline in FIG. 3, the disk has reached the EOL of being completely worn (i.e.,), and at this point the disk may easily lead to storage performance degradation. Therefore, for this situation, a low (or even 0) weight needs to be assigned to the wear W in the wear leveling, and it is assumed that $\omega_{\mu=100\%}=1\%$, which is only illustrative and not restrictive, and may also be 0.1% or another value. As mentioned above, the degree of wear μ of the disk may have a consistent impact on the entire array during the healthy stage, and therefore, $\omega_{\mu=0\% \ to \ 85\%}$=a fixed value. It is assumed that at this stage, $\omega_1=\omega_2=\omega_3$33.33%. Various values are substituted into Equation (3), that is, $1\%=33.33\% \times e^{-15\% \cdot \lambda}$, thereby deriving λ=0.2331. It should be understood that the parameter values in the above calculation process are by way of example rather than restrictive, and may be adjusted according to actual needs.

Figure 4:
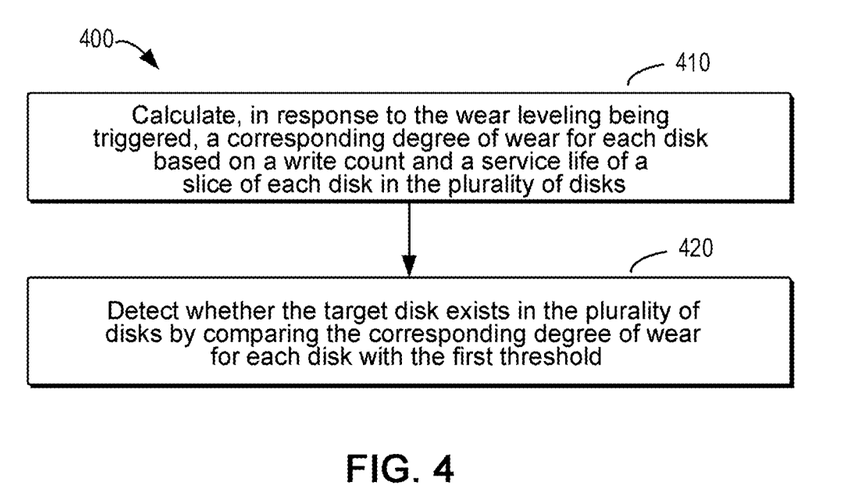
FIG. 4 illustrates a schematic diagram of a detection process of a degree of wear according to an embodiment of the present disclosure.

FIG. 4 illustrates a schematic diagram of a detection process 400 of a degree of wear according to an embodiment of the present disclosure. At 410, a corresponding degree of wear for each disk may be calculated, in response to wear leveling being triggered, based on a write count and a service life of a slice of each disk in the plurality of disks of the storage array. The calculation process is shown in the following Equation (4).

$$\mu = \frac{\sum_{disk} W_{slice}}{L_{disk}} \qquad \text{Equation (4)}$$

wherein $W_{slice}$ indicates the write count of a slice of the disk, and $L_{disk}$ indicates the service life of the disk, wherein the service life depends on various variables such as brand, size, type, and environment. At 420, it is detected whether there is a high-risk disk in a plurality of disks by comparing the corresponding degree of wear for each disk with a degree threshold for the disk wear.

Figure 5:
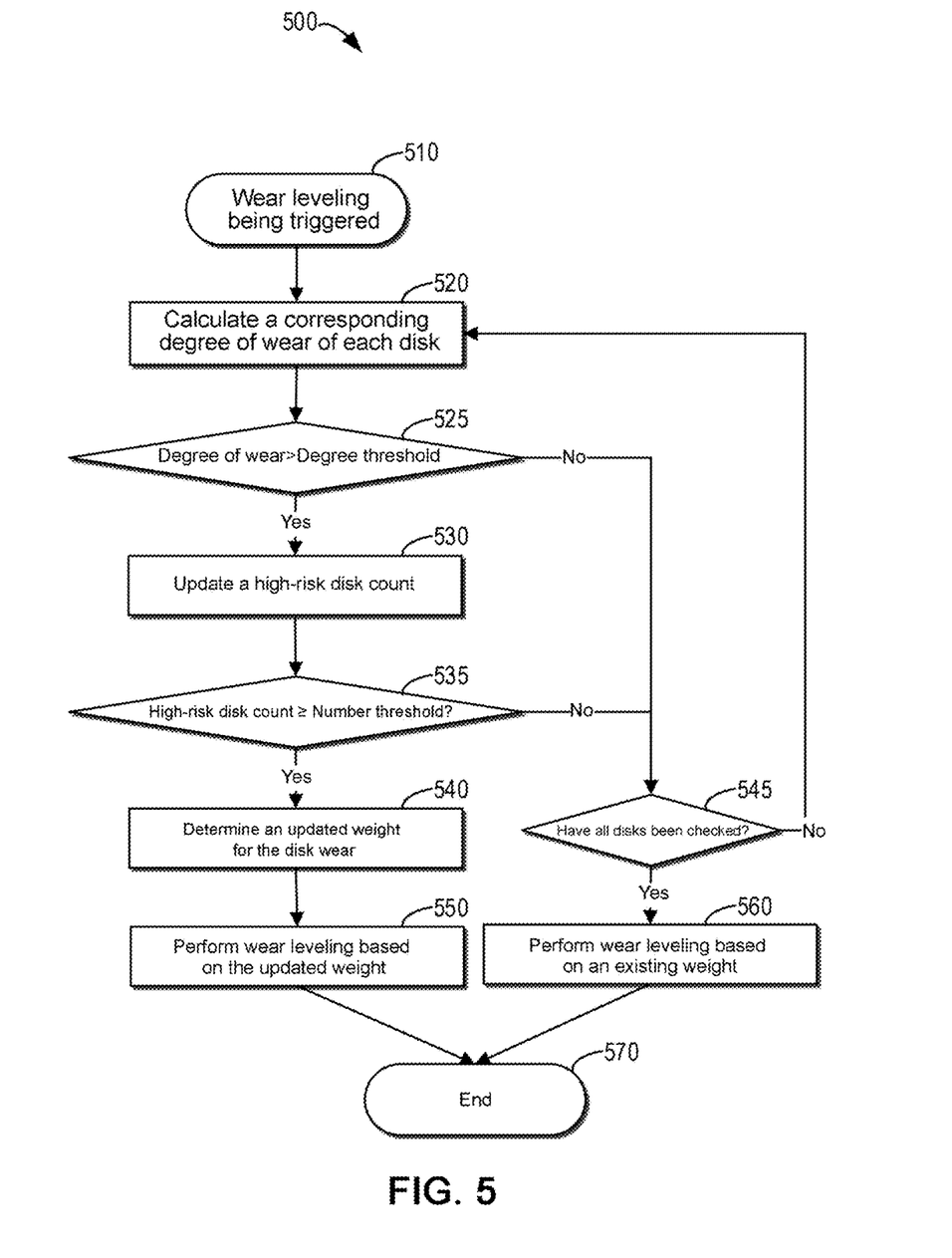
FIG. 5 illustrates an example process of wear leveling according to an embodiment of the present disclosure.

FIG. 5 illustrates an example process 500 of wear leveling according to an embodiment of the present disclosure. As shown in FIG. 5, at 510, wear leveling for a plurality of disks of a storage array is triggered. At 520, a corresponding degree of wear for each disk in the plurality of disks in the array may be calculated. At 525, it may be determined whether the degree of wear of the disk is greater than a degree threshold for disk wear. If the degree of wear of one or a plurality of disks is greater than the degree threshold, the one or a plurality of disks may be identified as high-risk disks. If no disk has a degree of wear greater than the degree threshold, at 545, it may be determined whether all disks have been checked.

According to the embodiments of the present disclosure, at 530, a count of high-risk disks may be updated, and every time a disk is identified as a high-risk disk, the count is increased by 1. At 535, it may be determined whether the updated high-risk disk count is greater than or equal to a number threshold for disk wear. If the high-risk disk count is greater than or equal to the number threshold, at 540, a weight for disk wear is updated to be used for a dynamic wear leveling strategy. If the high-risk disk count is less than the number threshold, at 545, it may be determined whether all disks have been checked.

According to the embodiments of the present disclosure, at 550, the dynamic wear leveling is performed on the plurality of disks in the array based on an updated weight for disk wear, so as to prevent concentrated aging of too many disks in the array and the need for concurrent swapping out. At 545, if all disks have been checked, at 560, the weight for disk wear will not be updated, and the wear leveling will be performed on the plurality of disks in the array based on existing weights.

Figure 6:
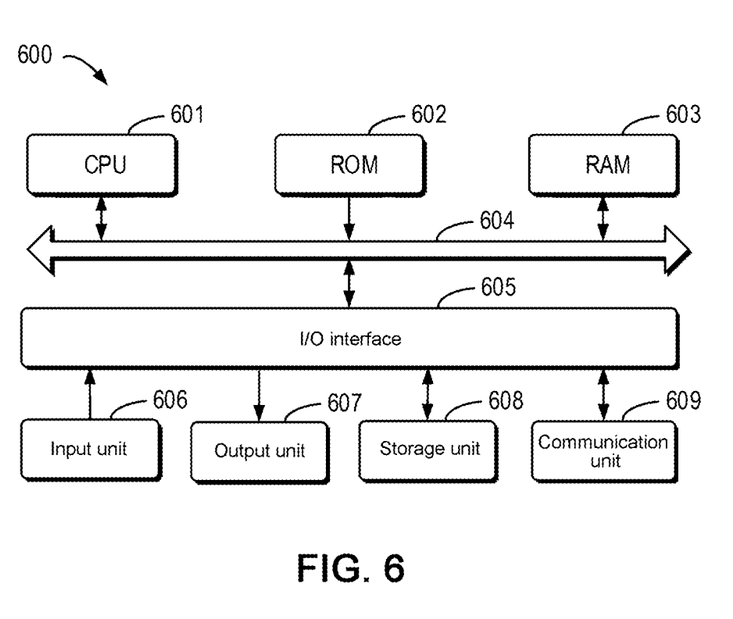
FIG. 6 illustrates a schematic block diagram of an example device that may be used to implement an embodiment of the present disclosure.

FIG. 6 illustrates a schematic block diagram of an example device 600 that may be used to implement some embodiments of the present disclosure. As shown in FIG. 6, the device 600 includes a central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the storage device 600 may also be stored in the RAM 603. The CPU 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard, a mouse, and the like; an output unit 607, such as various types of displays, speakers, and the like; the storage unit 608, such as a magnetic disk, a compact disc, and the like; and a communication unit 609, such as a network card, a modem, a wireless communication transceiver, and the like. The communication unit 609 allows the device 600 to exchange information/data with other devices via a computer network such as the Internet and/or various telecommunication networks.

The various processes and processing described above, such as the method 200, may be performed by the processing unit 601. For example, in some embodiments, the method 200 may be implemented as a computer software program that is tangibly included in a machine-readable medium such as the storage unit 608. In some embodiments, part of or all the computer program can be loaded and/or installed onto the device 600 via the ROM 602 and/or the communication unit 609. One or more actions of the method 200 described above can be performed when the computer program is loaded into the RAM 603 and executed by the CPU 601.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages such as Smalltalk and C++, and conventional procedural programming languages such as "C" language or the like. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block of the flowcharts and/or the block diagrams and combinations of blocks in the flowcharts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means (e.g., specialized circuitry) for implementing the functions/acts specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flowcharts and/or block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the functions involved. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for wear leveling, comprising:
identifying a detected disk as a target disk in response to detecting the disk with a degree of wear greater than a first threshold in a plurality of disks of a storage array;
determining, in response to the number of the target disks being greater than or equal to a second threshold, an updated weight for disk wear based on the degree of wear of the target disk and an impact attenuation factor associated with the degree of wear; and
performing, based on the updated weight for the disk wear, wear leveling for an input/output (IO) request on the plurality of disks in the storage array.

2. The method according to claim 1, further comprising:
calculating the impact attenuation factor based on Newton's law of cooling, based on a first weight corresponding to the disk being worn completely and a second weight corresponding to the degree of disk wear being less than or equal to the first threshold,
wherein the impact attenuation factor remains the same during the period from the disk being completely non-worn to the degree of wear being equal to the first threshold.

3. The method according to claim 1, further comprising:
calculating, in response to the wear leveling being triggered, a corresponding degree of wear for each disk based on a write count and a usage period of a slice of each disk in the plurality of disks; and
detecting whether the target disk exists in the plurality of disks by comparing the corresponding degree of wear for each disk with the first threshold.

4. The method according to claim 3, further comprising:
determining, in response to not detecting a disk with a corresponding degree of wear greater than the first threshold, whether all disks in the plurality of disks have been detected; and
performing, after determining that all disks in the plurality of disks have been detected, the wear leveling for the IO request on the plurality of disks based on a non-updated weight for the disk wear.

5. The method according to claim 3, further comprising:
determining, in response to the number of the target disks being less than the second threshold, whether all disks in the plurality of disks have been detected; and
performing, after determining that all disks in the plurality of disks have been detected, the wear leveling for the IO request on the plurality of disks based on a non-updated weight for the disk wear.

6. The method according to claim 1, wherein
the second threshold is determined based on a type of the storage array.

7. The method according to claim 1, wherein the wear leveling is further based on at least one of the following:
the temperature of each disk in the plurality of disks of the storage array; or
the capacity of each disk in the plurality of disks of the storage array.

8. The method according to claim 7, wherein the wear leveling causes data corresponding to the IO request to be distributed in a non-centralized manner among the plurality of disks of the storage array.

9. An electronic device, comprising:
a processor; and
a memory, the memory being coupled to the processor and storing instructions, wherein the instructions, when executed by the processor, cause the device to perform actions comprising:
identifying a detected disk as a target disk in response to detecting the disk with a degree of wear greater than a first threshold in a plurality of disks of a storage array;
determining, in response to the number of the target disks being greater than or equal to a second threshold, an updated weight for disk wear based on the degree of wear of the target disk and an impact attenuation factor associated with the degree of wear; and
performing, based on the updated weight for the disk wear, wear leveling for an IO request on the plurality of disks in the storage array.

10. The electronic device according to claim 9, wherein the actions further comprise:
calculating the impact attenuation factor based on Newton's law of cooling, based on a first weight corresponding to the disk being worn completely and a second weight corresponding to the degree of disk wear being less than or equal to the first threshold,
wherein the impact attenuation factor remains the same during the period from the disk being completely non-worn to the degree of wear being equal to the first threshold.

11. The electronic device according to claim 9, wherein the actions further comprise:
calculating, in response to the wear leveling being triggered, a corresponding degree of wear for each disk based on a write count and a usage period of a slice of each disk in the plurality of disks; and
detecting whether the target disk exists in the plurality of disks by comparing the corresponding degree of wear for each disk with the first threshold.

12. The electronic device according to claim 11, wherein the actions further comprise:
determining, in response to not detecting a disk with a corresponding degree of wear greater than the first threshold, whether all disks in the plurality of disks have been detected; and
performing, after determining that all disks in the plurality of disks have been detected, the wear leveling for the IO request on the plurality of disks based on a non-updated weight for the disk wear.

13. The electronic device according to claim 11, wherein the actions further comprise:
determining, in response to the number of the target disks being less than the second threshold, whether all disks in the plurality of disks have been detected; and
performing, after determining that all disks in the plurality of disks have been detected, the wear leveling for the IO request on the plurality of disks based on a non-updated weight for the disk wear.

14. The electronic device according to claim 9, wherein:
the second threshold is determined based on a type of the storage array.

15. The electronic device according to claim 9, wherein the wear leveling is further based on at least one of the following:
the temperature of each disk in the plurality of disks of the storage array; or
the capacity of each disk in the plurality of disks of the storage array.

16. The electronic device according to claim 15, wherein the wear leveling causes data corresponding to the IO request to be distributed in a non-centralized manner among the plurality of disks of the storage array.

17. A computer program product having a non-transitory computer readable medium which stores a set of instructions to perform wear leveling; the set of instructions, when carried out by computerized circuitry, causing the computerized circuitry to perform a method of
identifying a detected disk as a target disk in response to detecting the disk with a degree of wear greater than a first threshold in a plurality of disks of a storage array;
determining, in response to the number of the target disks being greater than or equal to a second threshold, an updated weight for disk wear based on the degree of wear of the target disk and an impact attenuation factor associated with the degree of wear; and
performing, based on the updated weight for the disk wear, wear leveling for an IO request on the plurality of disks in the storage array.

18. The computer program product according to claim 17, wherein the method further includes:
calculating the impact attenuation factor based on Newton's law of cooling, based on a first weight corresponding to the disk being worn completely and a second weight corresponding to the degree of disk wear being less than or equal to the first threshold,
wherein the impact attenuation factor remains the same during the period from the disk being completely non-worn to the degree of wear being equal to the first threshold.

19. The computer program product according to claim 17, wherein the method further includes:
calculating, in response to the wear leveling being triggered, a corresponding degree of wear for each disk based on a write count and a usage period of a slice of each disk in the plurality of disks; and
detecting whether the target disk exists in the plurality of disks by comparing the corresponding degree of wear for each disk with the first threshold.

20. The computer program product according to claim 17, wherein the wear leveling is further based on at least one of the following:
the temperature of each disk in the plurality of disks of the storage array; or
the capacity of each disk in the plurality of disks of the storage array.

* * * * *